(12) United States Patent
Shao et al.

(10) Patent No.: US 12,535,778 B2
(45) Date of Patent: Jan. 27, 2026

(54) METHOD AND INTERNET OF THINGS (IoTs) SYSTEM FOR SMART GAS FIREFIGHTING LINKAGE BASED ON GOVERNMENT SAFETY SUPERVISION

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Bin Liu, Chengdu (CN); Hongjian Liu, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 19/002,548

(22) Filed: Dec. 26, 2024

(65) Prior Publication Data

US 2025/0130534 A1   Apr. 24, 2025

(30) Foreign Application Priority Data

Oct. 25, 2024  (CN) .......................... 202411496120.5

(51) Int. Cl.
  *G05B 9/02*  (2006.01)
  *G05B 23/02*  (2006.01)
(52) U.S. Cl.
  CPC ............. *G05B 9/02* (2013.01); *G05B 23/027* (2013.01)
(58) Field of Classification Search
  None
  See application file for complete search history.

(56) References Cited

U.S. PATENT DOCUMENTS

2024/0420557 A1* 12/2024 Vapurcuyan ........... G08B 17/00
2025/0012625 A1*  1/2025 Lee ........................ G01H 17/00

FOREIGN PATENT DOCUMENTS

CN   110515340 B   12/2020
CN   110354432 B    2/2021
(Continued)

OTHER PUBLICATIONS

Machine translation of CN-118903765-A (Year: 2024).*
(Continued)

*Primary Examiner* — Hien D Khuu
*Assistant Examiner* — Istiaque Ahmed
(74) *Attorney, Agent, or Firm* — METIS IP LLC

(57) ABSTRACT

Embodiments of the present disclosure provide a method for smart gas firefighting linkage based on government safety supervision, wherein the method is executed by a smart gas government safety supervision management platform based on an Internet-of-Things (IoTs) system for smart gas firefighting linkage based on government safety supervision. The method comprises: determining production stage information of the one or more enterprises based on gas consumption statistics information, current production data, and production planning information of the one or more enterprises; obtaining feedback information from a gas company management platform of the smart gas government safety supervision object platform based on the production stage information of the one or more enterprises; obtaining at least one of alarm information, malfunction information, operating parameters, and hidden danger processing data of at least one set of gas firefighting equipment of the one or more enterprises, and assessing a fire risk level of each of the one or more enterprises; determining fire control parameters of the one or more enterprises based on the fire risk level of the one or more enterprises and the hidden danger processing (Continued)

data; determining an update command based on adjusted operating parameters; and sending the update command to at least one set of gas firefighting equipment corresponding to the update command, and controlling the gas firefighting equipment to update.

7 Claims, 5 Drawing Sheets

(56) References Cited

FOREIGN PATENT DOCUMENTS

| CN | 113724464 A | | 11/2021 | | |
|---|---|---|---|---|---|
| CN | 118012848 A | | 5/2024 | | |
| CN | 118365476 A | | 7/2024 | | |
| CN | 118903765 A | * | 11/2024 | ............ | A62C 37/50 |
| CN | 119075257 A | * | 12/2024 | ............ | G16Y 40/20 |
| KR | 102016661 B1 | | 8/2019 | | |
| TW | I729838 B | | 6/2021 | | |

OTHER PUBLICATIONS

Machine translation of CN-119075257-A (Year: 2024).*
Teng, Weiming et al., Information Security Monitoring and Protection of Gas Pipeline Network Control System, Process Automation Instrumentation. 39(9): 29-33, 2018.
Cho, Jae-Seung, A Study of USN-Based Smart Fire Protection System Design which Leads the Emergency Escape, Journal of the Korean Society of Design Culture, 21(4): 647-660, 2015.
Notification to Grant Patent Right for Invention in Chinese Application No. 202411496120.5 mailed on Jan. 13, 2025, 4 pages.
First Office Action in Chinese Application No. 202411496120.5 mailed on Dec. 27, 2024, 12 pages.

* cited by examiner

METHOD AND INTERNET OF THINGS (IoTs) SYSTEM FOR SMART GAS FIREFIGHTING LINKAGE BASED ON GOVERNMENT SAFETY SUPERVISION

CROSS-REFERENCE TO RELATED APPLICATIONS

This application claims priority of Chinese Patent Application No. 202411496120.5, filed on Oct. 25, 2024, the entire contents of which are incorporated herein by reference.

TECHNICAL FIELD

The present disclosure relates to the field of gas firefighting technology, and in particular, relates to a method and Internet of Things (IoTs) system for smart gas firefighting linkage based on government safety supervision.

BACKGROUND

With an acceleration of urbanization and an increase in population density, fire accidents often occur. The fires triggered by gas leaks or malfunctioning gas equipment are usually characterized by explosiveness, rapid diffusion, and violent combustion, which are prone to cause serious casualties and property losses.

In order to cope with the gas fires, CN110515340B proposes an inspection and remote control system and method for synergistic protection with a firefighting system. The method combines a SCADA system, a video monitoring system, and a firefighting system, which is capable of monitoring and controlling natural gas concentration, gas pipeline temperature, and smoke concentration within a firefighting sub-region, so as to timely alarm and adjust the on-site equipment operation status. However, the method fails to take into account differences in firefighting situations of different gas users/enterprises, resulting in ineffective gas fire control.

Therefore, it is desirable to propose a smart gas fire linkage method and Internet of Things (IoTs) system based on government safety supervision, which can give a reasonable protection program for different gas users/enterprises from a point of view of a gas management platform, and provide more comprehensive gas fire situation, which can be used to monitor the gas fire situation in a more comprehensive way.

SUMMARY

One or more embodiments of the present disclosure provide a method for smart gas firefighting linkage based on government safety supervision, wherein the method is executed by a smart gas government safety supervision management platform based on an Internet of Things (IoTs) system for smart gas firefighting linkage based on government safety supervision, comprising: obtaining gas consumption statistics information of one or more enterprises based on one or more flow monitoring devices controlled by a gas equipment object platform; obtaining current production data and production planning information of the one or more enterprises through a gas-using enterprise management platform on a smart gas government safety supervision object platform; determining production stage information of the one or more enterprises based on the gas consumption statistics information, the current production data, and the production planning information of the one or more enterprises; obtaining feedback information from a gas company management platform of the smart gas government safety supervision object platform based on the production stage information of the one or more enterprises; obtaining at least one of alarm information, malfunction information, operating parameters, and hidden danger processing data of at least one set of gas firefighting equipment of the one or more enterprises, wherein the at least one set of the gas firefighting equipment includes at least one of an alarming device, an alarming self-testing device, and a gas concentration detection device; assessing a fire risk level of each of the one or more enterprises based on at least one of the production stage information, the feedback information, the alarm information and/or the malfunction information, the operating parameters, and the hidden danger processing data of the at least one set of the gas firefighting equipment; determining fire control parameters of the one or more enterprises based on the fire risk level of the one or more enterprises and the hidden danger processing data, wherein the fire control parameters include adjusted operating parameters and enterprise fire inspection cycle of at least one set of updated gas firefighting equipment; determining an update command based on the adjusted operating parameters; and sending the update command to at least one set of gas firefighting equipment corresponding to the update command, and controlling the gas firefighting equipment to update.

One or more embodiments of the present disclosure provide an Internet of Things (IoTs) system for smart gas firefighting linkage based on government safety supervision, comprising: a smart gas government safety supervision service platform, a smart gas government safety supervision management platform, a smart gas government safety supervision sensor network platform, a smart gas government safety supervision object platform, a gas company sensor network platform, a gas equipment object platform, a smart gas user platform and a smart gas service platform, wherein the smart gas government safety supervision object platform includes a gas company management platform and a gas-using enterprise management platform, the gas equipment object platform is configured to control one or more flow monitoring devices to obtain gas consumption statistics information of one or more enterprises; the gas-using enterprise management platform is configured to obtain current production data and production planning information of the one or more enterprises; the smart gas government safety supervision management platform is configured to: determine production stage information of the one or more enterprises based on the gas consumption statistics information, the current production data, and the production planning information of the one or more enterprises; obtain feedback information from the gas company management platform of the smart gas government safety supervision object platform based on the production stage information of the one or more enterprises; obtain at least one of alarm information, malfunction information, operating parameters, and hidden danger processing data of at least one set of gas firefighting equipment of the one or more enterprises, wherein the at least one set of the gas firefighting equipment includes at least one of an alarming device, an alarming self-testing device, and a gas concentration detection device; assess a fire risk level of each of the one or more enterprises based on at least one of the production stage information, the feedback information, the alarm information and/or the malfunction information, the operating parameters, and the hidden danger processing data of the at least one set of the gas firefighting equipment; determine fire control parameters of the one or more enterprises based on the fire risk level of the one or more enterprises and the hidden danger processing data, wherein the fire control parameters include adjusted operating parameters and enterprise fire inspection cycle of at least one set of updated gas firefighting equipment; determine an update command based on the adjusted operating parameters; and send the update command to at least one set of gas firefighting equipment corresponding to the update command, and controlling the gas firefighting equipment to update.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering denotes the same structure, wherein.

DETAILED DESCRIPTION

Figure 1:
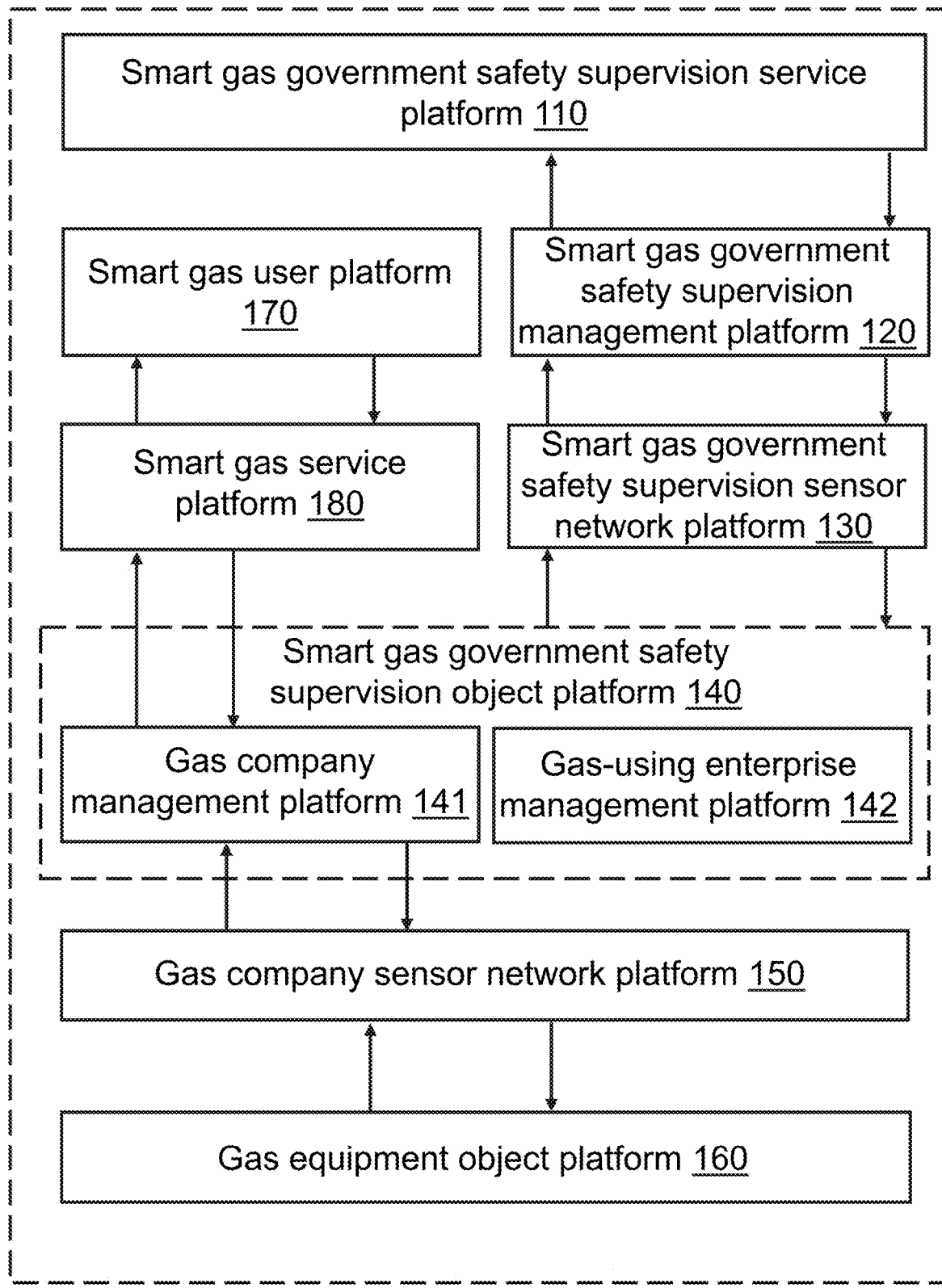
FIG. 1 is a schematic diagram illustrating an exemplary platform structure of an Internet of Things (IoTs) system for smart gas firefighting linkage based on government safety supervision according to some embodiments of the present disclosure.

In order to more clearly illustrate the technical solutions of the embodiments of the present disclosure, the following will briefly introduce the accompanying drawings that are required to be used in the description of the embodiments. Obviously, the accompanying drawings in the following description are only some examples or embodiments of the present disclosure, and it is possible for a person of ordinary skill in the art to apply the present disclosure to other similar scenarios in accordance with these drawings without creative labor. The present disclosure can be applied to other similar scenarios based on these drawings without creative labor. Unless obviously obtained from the context or the context illustrates otherwise, the same numeral in the drawings refers to the same structure or operation.

It should be understood that the terms "system," "device" as used herein, "unit" and/or "module" as used herein is a way to distinguish between different components, elements, parts, sections or assemblies at different levels. However, said words may be replaced by other expressions if other words accomplish the same purpose.

As shown in the specification and the claims, unless the context clearly suggests an exception, the words "one," "a," and/or "the" do not refer specifically to the singular, but may also include the plural. Generally, the terms "including" and "comprising" suggest only the inclusion of clearly identified steps and elements. In general, the terms "including" and "comprising" only suggest the inclusion of explicitly identified steps and elements that do not constitute an exclusive list, and the method or apparatus may also include other steps or elements.

Flowcharts are used in the specification to illustrate operations performed by a system in accordance with embodiments of the specification. It should be understood that the preceding or following operations are not necessarily performed in an exact sequence. Instead, steps can be processed in reverse order or simultaneously. Also, it is possible to add other operations to these processes, or to remove a step or steps from these processes.

Different gas users/enterprises are exposed to different levels of fire risk at different stages of production. For example, during a peak production period of an enterprise, the fire risk is higher than that of an early stage of the enterprise's production due to a frequent operation of the equipment, a high density of operators, and a rising temperature of the workshop. Therefore, fire management may take appropriate measures to ensure safety based on the characteristics of the enterprise and the changes in the production stage. When using a community Intelligent firefighting system proposed by CN110354432B to monitor the gas fire situation, it is able to take into account the fire alarm processing and the station control system through the linkage of firefighting system and SCADA system. However, the system does not address the differences in firefighting needs of different gas users/enterprises. There is a need to improve the gas fire control methodology. Embodiments of the present disclosure provide an Internet of Things (IoTs) system for smart gas firefighting linkage based on government safety supervision, which integrates a smart gas government safety supervision service platform, a smart gas government safety supervision object platform, a smart gas government safety supervision management platform, and other functional platforms. Through the synergy between the platforms, the system provides different fire management programs for different gas users/enterprises at different production stages and improves the management level of gas fire safety.

FIG. 1 is a schematic diagram illustrating an exemplary platform structure of an Internet of Things (IoTs) system for smart gas firefighting linkage based on government safety supervision according to some embodiments of the present disclosure.

As shown in FIG. 1, the IoTs system 100 for smart gas firefighting linkage based on government safety supervision comprises: a smart gas government safety supervision service platform 110, a smart gas government safety supervision management platform 120, a smart gas government safety supervision sensor network platform 130, a smart gas government safety supervision object platform 140, a gas company sensor network platform 150, a gas equipment object platform 160, a smart gas user platform 170, and a smart gas service platform 180.

The smart gas government safety supervision service platform 110 is a platform that provides a gas safety supervision service for a government user. The government user may be a manager of gas operating entity, or the like.

The smart gas government safety supervision management platform 120 is a comprehensive management platform for government management information. In some embodiments, the smart gas government safety supervision management platform 120 is configured as a combination of one or more of a microcontroller (MCU), an embedded processor, a graphics processing unit (GPU), or the like.

In some embodiments, the smart gas government safety supervision management platform 120 is configured to determine production stage information of the one or more enterprises based on the gas consumption statistics information, the current production data, and the production planning information of the one or more enterprises; obtain feedback information from the gas company management platform of the smart gas government safety supervision object platform based on the production stage information of the one or more enterprises; obtain at least one of alarm information, malfunction information, operating parameters, and hidden danger processing data of at least one set of gas firefighting equipment of the one or more enterprises, wherein the at least one set of the gas firefighting equipment includes at least one of an alarming device, an alarming self-testing device, and a gas concentration detection device; assess a fire risk level of each of the one or more enterprises based on at least one of the production stage information, the feedback information, the alarm information and/or the malfunction information, the operating parameters, and the hidden danger processing data of the at least one set of the gas firefighting equipment; determine fire control parameters of the one or more enterprises based on the fire risk level of the one or more enterprises and the hidden danger processing data, wherein the fire control parameters include adjusted operating parameters and enterprise fire inspection cycle of at least one set of updated gas firefighting equipment; determine an update command based on the adjusted operating parameters; and send the update command to at least one set of gas firefighting equipment corresponding to the update command, and control the gas firefighting equipment to update. More descriptions may be found in FIG. 2 and related descriptions.

In some embodiments, the smart gas government safety supervision management platform 120 is further configured to determine at least one firefighting stage of each of the one or more enterprises based on the production stage information and the feedback information of the one or more enterprises; determine a batch upload frequency based on the at least one firefighting stage; centrally upload, the alarm information and/or the malfunction information and the operating parameters of the at least one set of the gas firefighting equipment, to the smart gas government safety supervision service platform, based on the batch upload frequency; in response to determining that monitoring feedback obtained from the smart gas government safety supervision service platform indicates no anomalies, assess the fire risk level of each of the one or more enterprises based on the at least one firefighting stage, and the alarm information, the malfunction information, the operating parameters, and the hidden danger processing data of the at least one set of gas firefighting equipment; and in response to determining that the monitoring feedback indicates anomalies, set the fire risk level to a highest risk level. More descriptions may be found in FIG. 3 and related descriptions.

In some embodiments, the smart gas government safety supervision management platform 120 is further configured to determine the at least one firefighting stage based on enterprise basic information, the production planning information, the production stage information, and the feedback information of the one or more enterprises through a firefighting stage determination model, the firefighting stage determination model being a machine learning model, the enterprise basic information being obtained based on the smart gas government safety supervision object platform. More descriptions may be found in FIG. 4 and related descriptions.

In some embodiments, training of the firefighting stage determination model includes at least a first stage of training, the first stage of training includes: training the firefighting stage determination model based on a first training dataset; verifying the firefighting stage determination model based on a first validation dataset; and testing the firefighting stage determination model based on a first test dataset; wherein the first training dataset, the first test dataset, and first validation dataset include historical production stage information, historical feedback information corresponding to the historical production stage information, and historical enterprise basic information extracted from historical data, wherein a ratio of a data volume of the first training dataset, a data volume of the first test dataset, and a data volume of the first validation dataset are set to a first preset ratio, there is no data overlap among the first training dataset, the first test dataset, and the first validation dataset, and a sample statistical difference of the first training dataset is greater than a preset difference threshold, and the preset difference threshold is related to a statistical value of a severity level of a historical gas fire incident. More descriptions may be found in FIG. 3 and related descriptions.

In some embodiments, the smart gas government safety supervision management platform 120 is further configured to determine an estimated accident probability and estimated accident information of the at least one set of gas firefighting equipment based on the hidden danger processing data, and the operating parameters, the at least one firefighting stage, and the fire risk level of the at least one set of the gas firefighting equipment; and determine the fire control parameters of the one or more enterprises based on the estimated accident probability, the estimated accident information, and the operating parameters of the at least one set of gas firefighting equipment and a first preset threshold. More descriptions may be found in FIG. 2 and related descriptions.

In some embodiments, different production stages have different first preset thresholds, and a first preset threshold of a current production stage is related to a count of firefighting stages in the current production stages. More descriptions may be found in FIG. 2 and related descriptions.

In some embodiments, the smart gas government safety supervision management platform 120 is further configured to determine, based on the operating parameters, the at least one firefighting stage, the fire risk level, and the hidden danger processing data of the at least one set of gas firefighting equipment, the estimated accident probability and the estimated accident information of the at least one set of gas firefighting equipment through a preset algorithm. More descriptions may be found in FIG. 2 and related descriptions.

In some embodiments, the smart gas government safety supervision management platform 120 is further configured to determine, through a probability determination model, the estimated accident probability of the at least one set of gas firefighting equipment based on the operating parameters and the fire risk level of the at least one set of gas firefighting equipment, the probability determination model being trained based on a second training dataset, the second training dataset being generated based on the hidden danger processing data. More descriptions may be found in FIG. 5 and related descriptions.

The smart gas government safety supervision sensor network platform 130 is a functional platform that transmits and manages data and information from government-related platforms. For example, the smart gas government safety supervision sensor network platform 130 is configured as a communication base station, router, Wireless Local Area Network (WLAN) device, or the like.

The smart gas government safety supervision object platform 140 is a platform for the generation of governmental regulatory information and the execution of control information.

In some embodiments, the smart gas government safety supervision object platform 140 includes a gas company management platform 141 and a gas-using enterprise management platform 142.

The gas company management platform 141 is a platform that manages gas-related data and fire-related data of gas companies.

The gas-using enterprise management platform 142 refers to a platform for managing information related to an enterprise that uses gas. In some embodiments, the gas-using enterprise management platform 142 is configured to obtain the current production data and the production planning information of the enterprise. The smart gas government safety supervision object platform 140 may obtain and upload enterprise basic information, the current production data, and the production planning information through the gas-using enterprise management platform 142 to the smart gas government safety supervision management platform 120. More descriptions of the current production data and the production planning information may be found in FIG. 2. More descriptions of the enterprise basic information may be found in FIG. 3 and the related descriptions. The gas-using enterprise is an enterprise that uses a large amount of gas in the production process.

The gas company sensor network platform 150 is a platform for sensing information and controlling communication. For example, the gas company sensor network platform 150 may be configured as a communications base station, a router, a wireless device, or the like.

The gas equipment object platform 160 is a functional platform for sensing information generation and controlling information execution. In some embodiments, the gas equipment object platform 160 may be configured to control one or more flow monitoring devices to obtain the gas consumption statistics information of one or more enterprises. More descriptions of obtaining the gas consumption statistics information may be found in FIG. 3 and related descriptions.

In some embodiments, the gas equipment object platform 160 may be configured as a gas firefighting equipment.

The gas firefighting equipment refers to an equipment for monitoring and disposing of issues related to gas firefighting. In some embodiments, the gas firefighting equipment includes at least one of an alarming device, an alarming self-testing device, and a gas concentration detection device.

The alarming device is configured to issue alarm information.

The gas concentration detection device is configured to detect an ambient gas concentration. In some embodiments, the gas concentration detection device is built-in with components for communication.

The alarming self-testing device is configured to detect whether the alarming device and the gas concentration detection device are working properly. In response to detecting that the alarming device and/or the gas concentration detection device are not working properly, the alarming self-testing device may issue malfunction information.

The flow monitoring devices are devices used to monitor a gas flow, such as a flow sensor, or the like.

The smart gas user platform 170 is a platform that provides a gas user with data related to gas consumption and a solution for gas problems. The gas user may be an industrial gas user, a commercial gas user, an ordinary gas user, or the like. In some embodiments, the smart gas user platform 170 may be configured as a user terminal device.

The smart gas service platform 180 is a platform that provides the gas user with a gas service.

In some embodiments, the smart gas government safety supervision service platform 110 may interact with the smart gas government safety supervision management platform 120. For example, the smart gas government safety supervision management platform 120 may centrally upload the alarm information and/or the malfunction information and the operating parameters of the at least one set of the gas firefighting equipment to the smart gas government safety supervision service platform 110. As another example, the smart gas government safety supervision management platform 120 may obtain monitoring feedback from the smart gas government safety supervision service platform 110.

In some embodiments, the smart gas government safety supervision management platform 120 may interact with the smart gas government safety supervision object platform 140 via the smart gas government safety supervision sensor network platform 130. For example, the smart gas government safety supervision management platform 120 may upload production stage information of the one or more enterprises to the gas company management platform 141 via the smart gas government safety supervision sensor network platform 130. As another example, the smart gas government safety supervision management platform 120 may obtain the current production data, the production planning information, and the enterprise basic information, or the like, from the gas-using enterprise management platform 142 via the smart gas government safety supervision sensor network platform 130.

In some embodiments, the gas company sensor network platform 150 may interact with the gas company management platform 141 of the smart gas government safety supervision object platform 140 and the gas equipment object platform 160. For example, the gas company sensor network platform 150 obtains and uploads the alarm information and the malfunction information of the at least one set of the gas firefighting equipment, and the gas consumption statistics information of the one or more enterprises, from the gas equipment object platform 160 to the smart gas government safety supervision object platform 140 of the gas company management platform 141. The gas company management platform 141 transmits the alarm information, the malfunction information, and the gas consumption statistics information to the smart gas government safety supervision management platform 120. As another example, the smart gas government safety supervision management platform 120 may transmit the update command to the gas equipment object platform 160.

In some embodiments of the present disclosure, the IoTs system for smart gas firefighting linkage based on government safety supervision can form a closed-loop of information operation between the smart gas government safety supervision management platform and the smart gas user platform and other platforms, and coordinate and operate regularly under an unified management of the smart gas government safety supervision management platform to realize the informatization and intellectualization of the gas fire linkage management.

Figure 2:
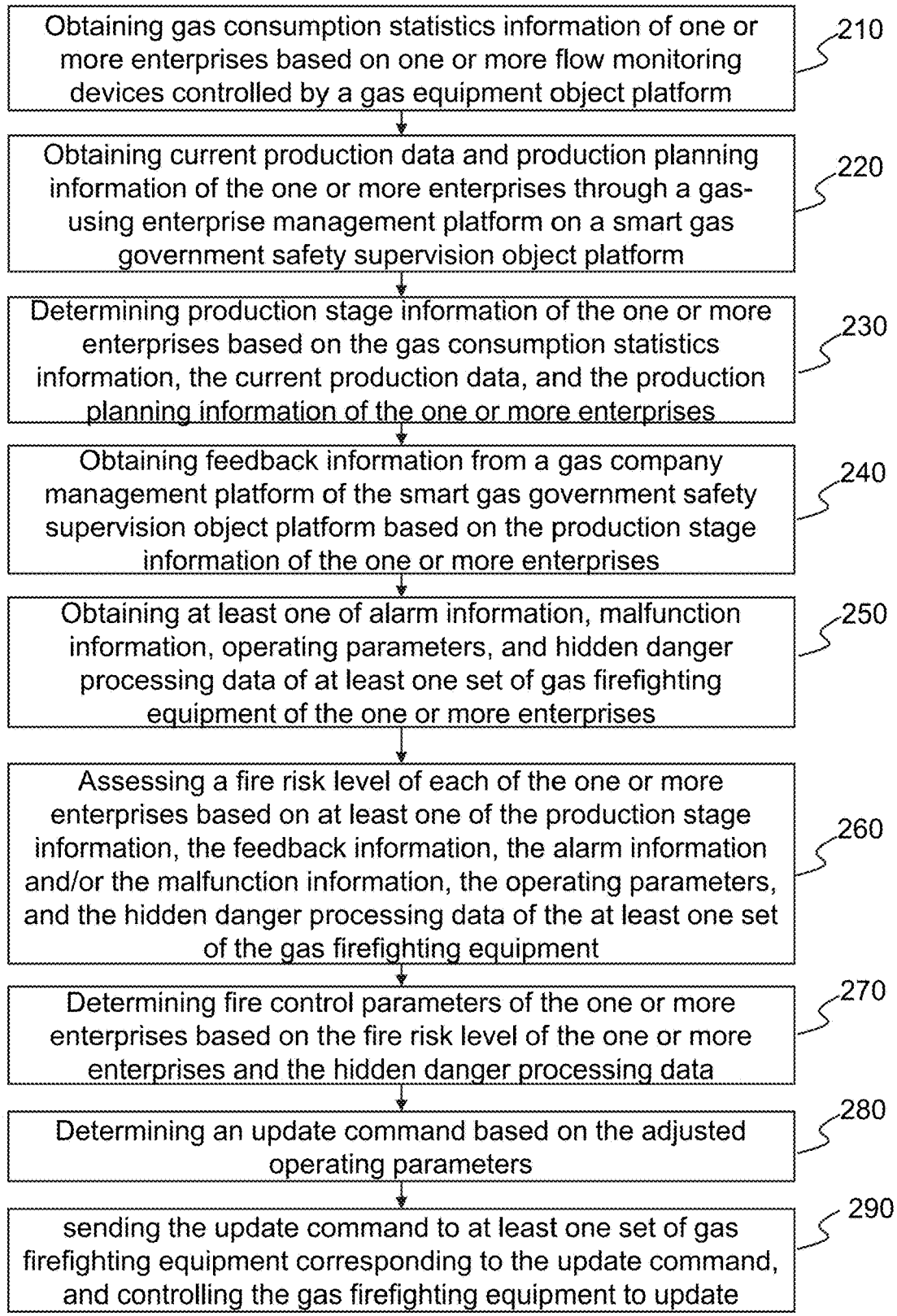
FIG. 2 is an exemplary flowchart illustrating a method for smart gas firefighting linkage based on government safety supervision according to some embodiments of the present disclosure.

FIG. 2 is an exemplary flowchart illustrating a method for smart gas firefighting linkage based on government safety supervision according to some embodiments of the present disclosure. In some embodiments, the process 200 is performed by the smart gas government safety supervision management platform 120. As shown in FIG. 2, the process 200 includes following operations.

In 210, obtaining gas consumption statistics information of one or more enterprises based on one or more flow monitoring devices controlled by a gas equipment object platform.

The one or more enterprises use gas for production activities, such as industrial gas companies, commercial gas companies, etc.

The gas consumption statistics information is information obtained by counting the use and distribution of gas in an organization. In some embodiments, the gas consumption statistics information may include a production channel of a product produced by the enterprise and the gas consumption of a preset time period for the production channel.

The production channel may include different production lines. For example, the gas consumption statistics information includes (a1, b1), (a2, b2), . . . , (an, bn), wherein a1, a2, . . . , and an denote different production lines, b1, b2, . . . , and bn denotes different corresponding gas consumptions of production lines a1, a2, . . . , and an during the preset time period. The preset time period may be set according to the demand. For example, the preset time period is one hour or two hours, or the like.

In some embodiments, the smart gas government safety supervision management platform 120 may obtain gas consumption statistics information of different production channels at the preset period of time through the flow monitoring device based on the gas equipment object platform 160. More descriptions of the flow monitoring device may be found in FIG. 1 and related descriptions.

In 220, obtaining current production data and production planning information of the one or more enterprises through a gas-using enterprise management platform on a smart gas government safety supervision object platform.

The current production data refers to production condition during the preset time period in which the enterprise is currently located. In some embodiments, the current production data may include a production channel and a current production of the production channel during the preset time period in which the enterprise is currently located. For example, the current production data may be denoted as (line 1, current output 1), (line 2, current output 2).

The production planning information is information related to planning for production of the enterprise. For example, the production planning information may include a production plan and a production program developed by the enterprise, such as a planning production of the product at each stage, and a planning usage of gas at each stage. For example, the production planning information of the enterprise that produces the parts includes different processing stages, such as (1) transportation and preservation of raw materials, (2) preparation for production, (3) manufacture of blanks, (4) machining, (5) heat treatment, (6) assembly, (7) testing, (8) commissioning, or the like.

In some embodiments, the smart gas government safety supervision management platform 120 may obtain, through the gas-using enterprise management platform 142 of the smart gas government safety supervision object platform 140, the current production data and the production planning information uploaded by the enterprise user.

In 230, determining production stage information of the one or more enterprises based on the gas consumption statistics information, the current production data, and the production planning information of the one or more enterprises.

The production stage information is information related to the production stage of the gas used by the enterprise. For example, the production stage information includes a current production stage and a production channel of the enterprise, and standards or requirements for the gas use during a current production stage.

The different production stages may correspond to different supply states of the gas. In some embodiments, the production stage is divided based on a gas consumption parameter. The gas consumption parameter is data related to gas during the production process, such as whether or not gas is used, a rate of gas use, an amount of gas consumption, a way of gas use, or the like. The way of gas use may include a continuous gas supply or an intermittent gas supply, or the like.

In some embodiments, stages that require the use of gas and have a similar or identical gas use parameter are classified as a same production stage, and stages that do not require the use of gas and/or have widely varying gas use parameters are classified as different production stages.

For example, in the actual production process, assuming that only processing stages (3), (4), (5), and (7) require the use of gas in the stages (1)-(8), and stages (1), (2), (6), and (8) do not require the use of gas, the stages (1), (2), (6), and (8) are classified as a production stage 1. The stages (3), (4), (5), and (7) are further divided: if gas use parameters of the stages (3), (4), (5), and (7) are different, the production stages are divided into a production stage 1 corresponding to the stage (3), a production stage 2 corresponding to the stage (4), a production stage 3 corresponding to the stage (5), and a production stage 4 corresponding to the stage (7). If the gas use parameters of stages (3), (4), (5), and (7) are the same, the stages (3), (4), (5), and (7) are classified as the production stage 2.

In some embodiments, the smart gas government safety supervision management platform 120 determines the production stage information in which the enterprise is located, based on the gas consumption statistics information, the current production data, and the production planning information of the one or more enterprises.

For example, the smart gas government safety supervision management platform 120 may compare the current production data and the gas consumption statistics information with the production planning information, identify similar stages as a same production stage, and analyze the production stage in which the enterprise is located, and determine the production planning information corresponding to the production stage as the production stage information in which the enterprise is located.

For example, if current production data and the gas consumption statistics information of the production stage S1 have reached a minimum value of the planning production output and planning gas consumption in the production planning information of the enterprise; at the same time, current production data and gas consumption statistics information of a next production stage S2 of the production stage S1 have not reached the planning product output and the planning gas consumption in the production planning information, which indicates that the enterprise is in the production stage S2.

Exemplarily, the production planning information includes three production stages, and each production line corresponds to a gas consumption top line of 20. The first production stage includes four production lines of a production line a, a production line b, a production line c, and a production line d. The planning production output in the first stage is 100~120, the production time is T1~T2, and the production products include A1, A2, A3, and A4. The second production stage has 2 production lines, which are production line e and production line f. The planning gas consumption of production line e is 20 and the planning gas consumption of production line f is 15. The planning production output in the second stage is 90~100, the production time is T3~T4, and the production products include B1 and B2. The third production stage includes one production line, i.e., a production line g. The planning gas consumption of production line g is 10. The planning product output of the third production stage is 120~150, and the production time is T5~T6, and the production product includes C.

The gas consumption statistics information of the current gas is that: the gas consumption of production lines a-g are 20, 20, 20, 20, 20, 12, 10, and 0, respectively; the current production data is that: the product output of production lines a-g are 110, 115, 100, 120, 70, 65, and 0. If the gas consumption of production lines a-d all reach the planning gas consumption of 20 in the first production stage, and the production output is within the planning production output of 100~120 in the first stage, the production of the first production stage has been completed. If the production lines e-f do not reach the planning gas consumption of the second production stage, and the production output does not reach the planning product output of 90~100 of the second production stage, the production is still in the second stage. If the gas consumption of the production line g is 0 and the product output is 0, the third stage has not yet started.

Therefore, the current production is in the second stage, and the smart gas government safety supervision management platform 120 may determine the production planning information corresponding to the second production stage as the production stage information of the enterprise. The production stage information includes that: the second production stage includes 2 production lines of production line e and production line f, wherein the production line e is implemented with a standard of gas consumption of 20, and the production line f is implemented with a standard of gas consumption of 15, the production output of the second production stage is 90~100, the production time is T3~T4, and the production products include B1 and B2.

In 240, obtaining feedback information from a gas company management platform of the smart gas government safety supervision object platform based on the production stage information of the one or more enterprises.

The feedback information refers to feedback from the gas company on the production stage information. In some embodiments, the feedback information may include a result of comparing the production stage information provided by the gas company with information monitored by the government, which may be described as "information consistent" or "inconsistent information." If the production stage information provided by the gas company matches the information monitored by the government, the result is "information consistent," and the feedback information includes the production stage information. On the other hand, the result is "information inconsistent" and the gas company is required to update the production stage information, and the feedback information may include updated production stage information.

In some embodiments, the smart gas government safety supervision management platform 120 obtains the feedback information uploaded by the gas company through the gas company management platform 141.

In 250, obtaining at least one of alarm information, malfunction information, operating parameters, and hidden danger processing data of at least one set of gas firefighting equipment of the one or more enterprises. The at least one set of the gas firefighting equipment includes at least one of an alarming device, an alarming self-testing device, and a gas concentration detection device.

The alarm information is an alarm signal that is sent out when the gas firefighting equipment detects a dangerous situation. The alarm information includes an alarm time and an ambient gas concentration corresponding to the alarm time. The alarm information may include one or more forms such as a voice message, an audible message, a light message, or the like.

The ambient gas concentration refers to gas concentration measured by the gas concentration detection device, which may be expressed as a number or a rating.

The malfunction information is information recorded when the gas firefighting equipment malfunctions or becomes abnormal. The malfunction information may include a recording of problems such as abnormalities in the operating status of the equipment, sensor malfunctions, or the like.

The operating parameters are parameters associated with the operation of the gas firefighting equipment. In some embodiments, the operating parameters of the gas firefighting equipment include a gas concentration alarm threshold, a hidden danger self-testing cycle, and an alarming device self-testing cycle. The hidden danger self-testing cycle is a cycle for checking the gas concentration detection device. The alarming device self-testing cycle is a cycle for checking the alarming device. The gas concentration alarm threshold is a minimum value at which the alarming device alarms. The hidden danger processing data is case data for handling gas hazards.

The hidden danger processing data includes accident records of the at least one gas firefighting equipment in the historical records of multiple enterprises, and the accident records include historical accident information. The historical accident information is information related to historical accidents that have occurred, such as a historical accident type, a historical damage level of a historical accident, a historical affected range, and a historical emergency. The accident type may include a malfunction and/or an alarm, or the like.

In some embodiments, the hidden danger processing data further includes a historical firefighting stage and a historical fire risk level of the enterprise when the incident happens, a historical operating parameter of at least one gas firefighting equipment, and a historical fire control parameter after the incident. The historical fire control parameters include historical adjusted operating parameters and a historical enterprise fire inspection cycle.

More descriptions of the fire control parameters, the adjusted operating parameters, and the enterprise fire inspection cycle may be found in the related descriptions later.

In some embodiments, the smart gas government safety supervision management platform 120 obtains the alarm information, the malfunction information, the operating parameters, and the hidden danger processing data of the at least one set of gas firefighting equipment of the one or more enterprises in multiple ways.

In some embodiments, the smart gas government safety supervision management platform 120 obtains, via the smart gas government safety supervision sensor network platform 130, the alarm information and/or the malfunction information and/or, and the operating parameters uploaded by the smart gas government safety supervision object platform 140. The smart gas government safety supervision object platform 140 may obtain the alarm information and/or the malfunction information, and the operating parameters of the at least one set of gas firefighting equipment based on the gas company management platform 141.

The gas firefighting equipment may obtain the alarm information based on the alarming device and the malfunction information based on the alarming self-testing device. The alarming device may determine the alarm information based on the ambient gas concentration and the gas concentration alarm threshold. Exemplarily, when the ambient gas concentration is greater than or equal to the gas concentration alarm threshold, the alarming device records an alarm time and the ambient gas concentration corresponding to the alarm time as the alarm information.

In some embodiments, the alarming self-testing device automatically detects whether the gas concentration detection device is operating properly based on the hidden danger self-testing cycle; and detects whether the alarming device is operating properly based on the alarming device self-testing cycle. In response to at least one of the gas concentration detection device and the alarming device is operating improperly, the alarming self-testing device sends the malfunction information to the smart gas government safety supervision object platform 140 and/or the smart gas government safety supervision management platform 120.

The alarming self-testing device may determine whether the gas concentration detection device and/or the alarming device are functioning properly in a variety of ways. For example, the alarming self-testing device sends a handshake command to the gas concentration detection device and/or the alarming device by communication, and accept the handshake command by the gas concentration detection device and/or the alarming device, which indicates that the communication of the alarming device is normal.

In some embodiments, the smart gas government safety supervision management platform 120 obtains the ambient gas concentration of the gas concentration detection device and detects whether an acquisition frequency of the ambient gas concentration meets a preset requirement during a preset time period. If the acquisition frequency of the ambient gas concentration does not meet a preset requirement during a preset time period, the gas concentration detection device is operating properly, and if the acquisition frequency of the ambient gas concentration meets a preset requirement during a preset time period, the gas concentration detection device is operating impoperly. When the gas concentration detection device is operating properly, whether the ambient gas concentration in the alarm information sent by the alarming device is the same as the ambient gas concentration detected by the gas concentration detection device may be determined. If the ambient gas concentration in the alarm information sent by the alarming device is the same as the ambient gas concentration detected by the gas concentration detection device, the alarming device is operating properly, and if the ambient gas concentration in the alarm information sent by the alarming device is not the same as the ambient gas concentration detected by the gas concentration detection device, the alarming device is operating improperly.

In some embodiments, the smart gas government safety supervision management platform 120 determines the hidden danger processing data from historical data.

In 260, assessing a fire risk level of each of the one or more enterprises based on at least one of the production stage information, the feedback information, the alarm information and/or the malfunction information, the operating parameters, and the hidden danger processing data of the at least one set of the gas firefighting equipment.

The fire risk level is a parameter that reflects the risk resistance of the gas firefighting equipment. The higher the fire risk level, the higher the risk resistance of the gas firefighting equipment corresponding to the operating parameters. In some embodiments, the fire risk level includes different levels, such as a low risk, a medium risk, and a high risk.

In some embodiments, the smart gas government safety supervision management platform 120 assesses the fire risk level of each of the one or more enterprises in multiple ways based on at least one of the production stage information, the feedback information, the alarm information and/or the malfunction information, the operating parameters, and the hidden danger processing data of the at least one set of the gas firefighting equipment.

For example, the smart gas government safety supervision management platform 120 determines an alarm frequency and/or a malfunction frequency based on the alarm information and/or the malfunction information of the at least one set of the gas firefighting equipment; determines a hazard coefficient of the operating parameter of the firefighting equipment based on the production stage information, the feedback information, and the hidden danger processing data of the one or more enterprises; determines a firefighting score based on the alarm frequency and/or the malfunction frequency, and the hazard coefficient; and determines the fire risk level by searching the preset table based on the firefighting score.

The alarm frequency is a number of alarms of the gas firefighting equipment during the preset time period. The malfunction frequency is a number that the gas firefighting equipment has broken down during the preset time period. In some embodiments, the smart gas government safety supervision management platform 120 counts the alarm frequency of the preset time period from the alarm information and/or the malfunction frequency of the preset time period from the malfunction information.

The hazard coefficient is data used to assess a probability of an accident occurring under current operating parameters. In some embodiments, the smart gas government safety supervision management platform 120 determines an actual production stage based on the production stage information and the feedback information, finds hidden danger processing data based on the actual production stage to calculate and obtain the hazard coefficient. The actual production stage information refers to production stage information of a current stage of the enterprise, such as an updated production stage information obtained based on the feedback information.

Exemplarily, the smart gas government safety supervision management platform 120 may statistically count an accident frequency of each enterprise under each historical operating parameter in the hidden danger processing data; compare the current operating parameter of each enterprise with a historical operating parameter in the hidden danger processing data to obtain a first similarity, and count a historical accident frequency corresponding to a historical operating parameter with a highest first similarity in the hidden danger processing data; and take the historical accident frequency as the hazard coefficient corresponding to the current operating parameter. The historical accident frequency refers to a number of times historical accidents occur within a predetermined period of time in history.

For example, enterprise A has three accident records under an operating parameter x, wherein two accidents have occurred in the production line 1 and one accident has occurred in the production line 4. The enterprise A has 10 accident record in total, so the accident frequency under the operating parameter x is 30%.

The firefighting score is data used to reflect a safety degree of the fire facilities. The firefighting score may be expressed as a number, for example, the firefighting score is expressed as a number ranging from 1 to 100, and the higher the firefighting score, the safer the fire facilities.

In some embodiments, the smart gas government safety supervision management platform 120 may determine the firefighting score based on the alarm frequency and/or the malfunction frequency and the hazard coefficient in multiple ways. For example, the firefighting score is negatively correlated with the alarm frequency, the malfunction frequency, and the hazard coefficient.

Exemplarily, the firefighting score is calculated by an equation (1). The equation (1) is shown below:

$$P = \frac{K_1}{F_1 + F_2} + \frac{K_2}{C} \quad (1)$$

Wherein P indicates a firefighting score of the gas firefighting equipment under the operating parameter, and C indicates a hazard coefficient of the gas firefighting equipment under the operating parameter. K1 and K2 indicate coefficients greater than 0, F1 indicates the alarm frequency, and F2 indicates the malfunction frequency.

In some embodiments, the smart gas government safety supervision management platform 120 may determine the fire risk level by searching the preset table based on the firefighting score. The preset table includes a mapping association of the firefighting score to a firefighting level. For example, 0 to 20 belong to level four, 21 to 60 belong to level three, 61 to 80 belong to level two, and 81 to 100 belong to level one. When the fire risk level of the enterprise belongs to level one, the enterprise has a highest risk resistance and the gas firefighting equipment has a lowest probability of fire risk.

Figure 3:
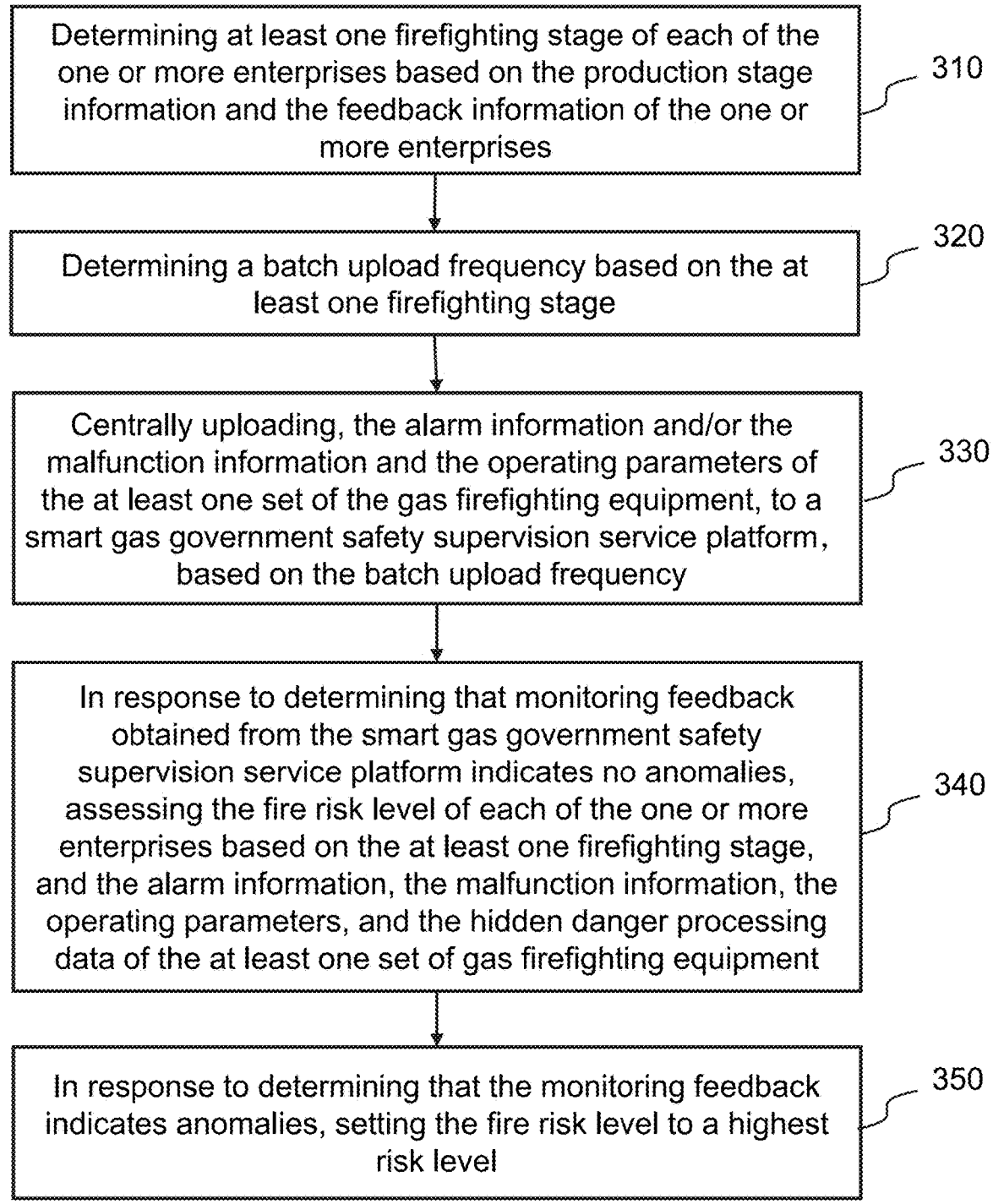
FIG. 3 is an exemplary flowchart illustrating a process for determining a fire risk level according to some embodiments of the present disclosure.

More descriptions of the fire risk level may be found in FIG. 3 and related descriptions.

In 270, determining fire control parameters of the one or more enterprises based on the fire risk level of the one or more enterprises and the hidden danger processing data.

The fire control parameters are data used to control and manage the gas firefighting equipment. In some embodiments, the fire control parameter includes adjusted operating parameters and an enterprise fire inspection cycle of at least one set of updated gas firefighting equipment.

The adjusted operating parameters refers to operating parameters of the gas firefighting equipment after updating. For example, the adjusted operating parameters include an updated gas concentration alarm threshold, an updated hidden danger self-testing cycle, and an updated alarming device self-testing cycle.

The enterprise fire inspection cycle refers to a periodic schedule of fire safety inspections and sampling for the enterprise. For example, the enterprise fire inspection cycle includes a sampling cycle for the at least one set of gas firefighting equipment. The enterprise fire inspection cycle is a cycle of data in which the smart gas government safety supervision management platform 120 automatically acquires the at least one set of gas firefighting equipment or a cycle of manual sampling inspection. For example, the cycle of manual sampling inspection is a cycle in which the government dispatches spot-checkers to conduct a mandatory check of the enterprise firefighting equipment. For example, the enterprise fire inspection cycle is checking the data of the gas firefighting equipment of each enterprise every twenty-four hours randomly, or checking the enterprises once a month by sampling personnel.

In some embodiments, the smart gas government safety supervision management platform 120 obtains the enterprise fire inspection cycle uploaded by an enterprise user in the gas-using enterprise management platform 142 via the smart gas government safety supervision sensor network platform 130.

The enterprise fire inspection may include a sampling of parameters related to the gas firefighting equipment. The parameters related to the gas firefighting equipment may include alarm information, ambient gas concentration, malfunction information, or the like.

In some embodiments, the smart gas government safety supervision management platform 120 determines the fire control parameter of the enterprise based on the fire risk level and the hidden danger processing data. For example, for a certain fire risk level of an enterprise, accident records of the enterprise may be retrieved from the hidden danger processing data, a number of the accident records corresponding to each historical fire control parameter may be counted under the fire risk level, and a historical fire control parameter with the lowest number of accident records may be selected as the fire control parameter of the enterprise.

In some embodiments, the determining fire control parameters of the one or more enterprises based on the fire risk level of the one or more enterprises and the hidden danger processing data includes: determining an estimated accident probability and estimated accident information of the at least one set of gas firefighting equipment based on the hidden danger processing data, the operating parameters, the at least one firefighting stage, and the fire risk level of the at least one set of the gas firefighting equipment; and determining the fire control parameters of the one or more enterprises based on the estimated accident probability, the estimated accident information, and the operating parameters of the at least one set of gas firefighting equipment and a first preset threshold.

The estimated accident probability is a probability of a predicting future accident.

The estimated accident information is information related to an accident that is predicted to be possible in the future. The estimated accident information may include an accident type that may occur, a damage degree that may be caused by the accident, a damage range that may be affected, and emergency response measures that may be triggered.

In some embodiments, for a certain enterprise, the smart gas government safety supervision management platform 120 may construct a first feature vector based on the operating parameters of the at least one set of gas firefighting equipment, the at least one firefighting stage, and the fire risk level of the certain enterprise; in the hidden danger processing data, construct a first reference vector based on historical operating parameters of the at least one set of gas firefighting equipment, at least one historical firefighting stage, and a historical fire risk level of the enterprise in the same industry of the certain enterprise in the historical data; calculate a second similarity between the first feature vector and the first reference vector, and count a number of accident records in which the second similarity is greater than a preset threshold; count a total number of the accident records of the enterprises in the same industry of the certain enterprise in the hidden danger processing data; and determine the estimated accident probability and the estimated accident information, based on the number of accident records in which the second similarity is greater than the preset threshold and the total number of the accident records.

Exemplarily, the total number of accident records is M, the number of accident records in which the second similarity is greater than the preset threshold is N. If N is not equal to 0, the estimated accident probability of the gas firefighting equipment is a ratio of N to M. The estimated accident information is accident information corresponding to a record with a highest similarity among the N records.

If N is equal to 0, the estimated accident probability of the gas firefighting equipment may be set to none or search a preset table to determine the default probability of the incident. The preset table includes mappings for different accident types and default probabilities. The default probabilities are empirically determined probabilities of occurrence of different accidents, which may be preset manually.

The first preset threshold is a pre-determined critical value for determining the probability of an accident occurring. In some embodiments, the first preset threshold is determined based on a probability of an accident that the gas firefighting equipment is capable to stand, and the first preset threshold is less than a maximum probability of the accident occurring. The maximum probability of the accident occurring may be determined based on the hidden danger processing data. For example, frequencies of different accident types of different companies may be statistics in the hidden danger processing data in the historical records of the company, and a maximum value of the frequency may be set as a maximum probability of the accident.

In some embodiments, the smart gas government safety supervision management platform 120 may compare the estimated accident probability with the first preset threshold, when the estimated accident probability is less than the first preset threshold, determine the historical fire control parameter corresponding to the accident in the hidden danger processing data as the fire control parameter; when the estimated accident probability is greater than or equal to the first preset threshold, set a preset fire control parameter as the fire control parameter. The preset fire control parameter may be manually preset, for example, the highest degree of protection may be set as the preset fire control parameter. When the preset fire control parameter is set to a highest degree of protection, the corresponding gas firefighting equipment has a lowest probability of an accident.

In some embodiments of the present disclosure, the smart gas government safety supervision management platform predicts the probability of the accident of the gas firefighting equipment, so as to take corresponding countermeasures for the gas firefighting equipment with a high probability of accidents and guarantee the gas firefighting equipment of safety operation.

In some embodiments, different production stages have different first preset thresholds, and a first preset threshold of a current production stage is related to a count of firefighting stages in the current production stages. More descriptions of the firefighting stages may be found in FIG. 3 and FIG. 4.

In some embodiments, the first preset threshold of the current production stage is negatively correlated with the number of the firefighting stages included in the current production stage. The greater the number of the firefighting stages of the current production stage, the smaller the first preset threshold of the current production stage.

The higher number of the firefighting stages of the current production stage indicates that gas consumption is more complex and changes of the gas consumption are more frequent, which indicates that gas consumption is less reliable and therefore more reliable fire control measures are needed. Embodiments of the present disclosure make the fire control more reliable by the need to adjust the first preset threshold to a smaller value so that a higher degree of protection setting is taken.

In some embodiments, the determining an estimated accident probability and estimated accident information of the at least one set of gas firefighting equipment based on the hidden danger processing data, the operating parameters, the at least one firefighting stage, and the fire risk level of the at least one set of the gas firefighting equipment includes: determining, based on the operating parameters, the at least one firefighting stage, the fire risk level, and the hidden danger processing data of the at least one set of gas firefighting equipment, the estimated accident probability and the estimated accident information of the at least one set of gas firefighting equipment through a preset algorithm. More descriptions of the firefighting stages may be found in FIG. 3 and related descriptions.

The preset algorithm is an algorithmic program in advance. For example, the preset algorithm is: constructing a second feature vector based on the operating parameters and the fire risk level of the at least one gas firefighting equipment, and constructing a second reference vector based on the historical operating parameters and the historical fire risk level of the at least one gas firefighting equipment in the hidden danger processing data; calculating a third similarity between the second feature vector and the second reference vector; statistically counting accident records corresponding to all second reference vectors of which the third similarity satisfies a preset ranking and is higher than a preset threshold; and determining the estimated accident probability and the estimated accident information, based on the firefighting stage, the third similarity, and the accident records.

The preset ranking may be the top n of the third similarity ranking, wherein n is positively correlated with the number of the firefighting stages. For example, n is equal to the number of the firefighting stages. The preset threshold may be preset according to the computational power.

In some embodiments, the smart gas government safety supervision management platform 120 counts a subsequent accident occurrence frequency of the second reference vectors of which the third similarity satisfies the preset ranking and is greater than the preset threshold, and determines the estimated accident probability in multiple ways. For example, taking a product of the lowest accident occurrence frequency and the corresponding third similarity as the gas firefighting equipment of the gas firefighting equipment, and taking a historical accident information corresponding to a second reference vector with the lowest accident occurrence frequency as the estimated accident information. As another example, taking an average of the subsequent accident occurrence frequencies as the estimated accident probability, and taking a historical accident information corresponding to a second reference vector with the highest third similarity as the estimated accident information.

Exemplarily, when the enterprise I belongs to a parts factory, the fire risk level is the second level, the operating parameter of the firefighting equipment before accident treatment is K1, and the number of the firefighting stages of the enterprise I is 3, the preset ranking may be set to the top 3 of the third similarity ranking. The smart gas government safety supervision management platform 120 may retrieve the historical records of all the parts factories with a fire risk level of the second level in the hidden danger processing data, and select the accident records corresponding to the parts factories with a third similarity ranking of top 3 and is greater than the preset threshold.

If a total of three records are retrieved. For accident record 1, the operating parameters of the firefighting equipment are adjusted to K2 after the accident, and counting the accident occurrence frequency when the firefighting equipment is operated in accordance with the operating parameters of K2 in the subsequent period, two similar accident records occur in a three month period after the accident, then the frequency of accidents is 2/3. For accident record 2, similarly, one similar accident record occurs in a four month period. For accident record 3, the operating parameters of the firefighting equipment is adjusted to K4 after the accident, retrieve and find no accident record that the gas firefighting equipment operates with the operating parameters of K4, the accident frequency is denoted as a preset frequency a. The preset frequency a is the minimum frequency of subsequent occurrence of accidents among all accident records corresponding to the operating parameters and firefighting level of record 3 in the hidden danger processing data, assuming that a is 1/5. The subsequent accident occurrence frequency of record 3 is lowest, assuming that the second similarity between record 3 and enterprise I is calculated to be 97%; calculating the product of the second similarity of 97% and subsequent accident occurrence frequency 1/5 of record 3, the estimated accident probability of the gas firefighting equipment is obtained to be 19.4%; and the accident information corresponding to record 3 is used as the estimated accident information.

Determining the estimated accident probability and the estimated accident information through the preset algorithm may determine the estimated accident probability and the estimated accident information corresponding to gas firefighting equipment under different fire control parameters, different firefighting stages, and different fire risk levels, so as to enable more accurate prediction of possible accidents.

In 280, determining an update command based on the adjusted operating parameters.

In some embodiments, the smart gas government safety supervision management platform 120 obtains the adjusted operating parameter in the fire control parameter to determine an update command based on the adjusted operating parameter.

The update command is a command to control the gas firefighting equipment to update the relevant parameters.

In some embodiments, the smart gas government safety supervision management platform 120 determines the update command based on the adjusted operating parameter in multiple ways. For example, a standards database is predefined, and the standards database includes standard operating parameters and standard update commands corresponding to the standard operating parameters. The standard operating parameters and the standard update commands are reference operating parameters and reference update commands corresponding to the reference operating parameters based on historical experience.

The smart gas government safety supervision management platform 120 may compare the similarity between the adjusted operating parameters and the standard operating parameters in the standard database. The similarity is negative to an Euclidean distance, a cosine similarity, or the like. When a standard operating parameter with a similarity greater than the preset similarity is found, the standard update command corresponding to the standard operating parameter is determined as the final update command.

In 290, sending the update command to at least one set of gas firefighting equipment corresponding to the update command, and controlling the gas firefighting equipment to update.

In some embodiments, the smart gas government safety supervision management platform 120 sends the update command to at least one set of gas firefighting equipment corresponding to the update command, to control the gas firefighting equipment to perform the update. The gas firefighting equipment may update, based on the update command, the operating parameters to the adjusted operating parameters and operate according to the adjusted operating parameters.

Some embodiments of the specification may assess the fire risk level of the one or more enterprises by monitoring the gas consumption statistics information, the current production data, and the production planning information of the one or more enterprises. So that the potential safety risks can be found in time, and firefighting safety can be improved by taking corresponding control measures on enterprises with a high fire risk level. By determining the fire control parameters and updating the gas firefighting equipment, the firefighting resource deployment can be optimized and the efficiency and accuracy of emergency response can be improved.

FIG. 3 is an exemplary flowchart illustrating a process for determining a fire risk level according to some embodiments of the present disclosure.

In some embodiments, the process 300 is performed by the smart gas government safety supervision management platform 120. As shown in FIG. 3, the process 300 includes operations 310-350 as follows.

In 310, determining at least one firefighting stage of each of the one or more enterprises based on the production stage information and the feedback information of the one or more enterprises. More descriptions on the production stage information and the feedback information may be found in FIG. 2 and related descriptions.

The firefighting stage is a stage that is divided according to firefighting-related requirements in a production process of the enterprise. One production stage may correspond to one or more firefighting stages, and different firefighting stages in the same production stage have different fire risks for gas. For example, in the same heat treatment stage, assuming that the heat treatment stage is cyclical in the use of gas for the processing of intermediate products, the firefighting risk of the gas is different during the cycle in which the gas is used and during the cycle in which the gas is not used; assuming that the heat treatment stage is the continuous use of gas for processing of intermediate products, the temperature in the workshop and the temperature in the workshop after a period of time of use are different when the gas is just used for processing, the temperature in the workshop after a period of time of use is higher, and the use of gas is more dangerous and the risk of firefighting is higher.

In some embodiments, for an enterprise, the smart gas government safety supervision management platform 120 obtains actual production stage information based on the production stage information and the feedback information corresponding to the production stage information, and search a preset table to obtain the firefighting stage.

The preset table includes a corresponding relationship between the production stage information and the firefighting stage division. The preset table may count the accident frequency actually occurring after prevention according to different firefighting stage divisions under each production stage in the historical data of the enterprise, and store the firefighting stage division with the lowest accident frequency and the corresponding production stage information are stored in the preset table.

In 320, determining a batch upload frequency based on the at least one firefighting stage.

The batch upload frequency refers to a number that the parameters related to the gas firefighting equipment are centralized and uploaded to the smart gas government safety supervision service platform 110.

In some embodiments, the batch upload frequency is positively correlated with the number of the firefighting stages. For example, if the number of firefighting stages is three, the batch upload frequency is determined as three; if the number of firefighting stages is five, the batch upload frequency is determined as five.

In 330, centrally uploading, the alarm information and/or the malfunction information and the operating parameters of the at least one set of the gas firefighting equipment, to a smart gas government safety supervision service platform based on the batch upload frequency.

In some embodiments, the smart gas government safety supervision management platform 120 centrally uploads the alarm information and/or the malfunction information, and the operating parameters of at least one set of gas firefighting equipment to the smart gas government safety supervision service platform 110. Thus facilitating the smart gas government safety supervision service platform 110 to perform centralized processing and global monitoring, and to determine whether a potential hidden danger exists.

In 340, in response to determining that monitoring feedback obtained from the smart gas government safety supervision service platform indicates no anomalies, assessing the fire risk level of each of the one or more enterprises based on the at least one firefighting stage, the alarm information, the malfunction information, the operating parameters, and the hidden danger processing data of the at least one set of gas firefighting equipment.

More descriptions of the firefighting stage, the alarm information and/or the malfunction information, the operating parameters, the hidden danger processing data, and the fire risk level may be found in FIG. 2 and related descriptions.

The monitoring feedback is a feedback from the government users on gas firefighting anomalies. For example, the monitoring feedback uses a boolean value to indicate a presence or an absence of an anomaly. Exemplarily, the presence of the anomaly is indicated as 1, and the absence of the anomaly is indicated as 0.

In some embodiments, when the monitoring feedback is the absence of the anomaly, the smart gas government safety supervision management platform 120 determines the fire risk level by vector matching, based on the at least one firefighting stage of the enterprise, the alarm information and/or malfunction information, the operating parameters, and the hidden danger processing data of the at least one set of gas firefighting equipment.

For example, for an enterprise, the smart gas government safety supervision management platform 120 may: count the number of malfunctions/alarms based on the alarm information and/or malfunction information of the at least one set of gas firefighting equipment; retrieve, from the hidden danger processing data, the number of accident records with a matching similarity greater than a preset threshold, as a first cases number; take a total number of accident records of all accidents of the enterprise in the hidden danger processing data as a second cases number; take a total number of accident records of the enterprises in the same industry in the hidden danger processing data as a third case number; and determine the firefighting score based on the first cases number, the second cases number and the third cases number, and determine the fire risk level based on the firefighting score.

In some embodiments, the smart gas government safety supervision management platform 120 may construct a feature vector based on the current firefighting stage, a number of malfunctions/alarms, and the operating parameters of the at least one set of gas firefighting equipment, and calculate a matching similarity of the feature vector to a reference vector in the hidden danger processing data. The reference vector may be constructed based on the firefighting stage, the number of malfunctions/alarms, and the operating parameters of the at least one set of gas firefighting equipment in the historical data.

In some embodiments, the firefighting score is positively correlated with a first case number and a third case number, and negatively correlated with a second case number. Exemplarily, the smart gas government safety supervision management platform 120 determines the firefighting score based on an equation (2). The equation (2) is shown below:

$$\text{Firefighting score} = k \times \text{first cases number} \times \text{third cases number}/\text{second cases number} \quad 2$$

Wherein k indicates a factor greater than 0. More descriptions of the firefighting score may be found in FIG. 2 and related descriptions.

In some embodiments, the smart gas government safety supervision management platform 120 searches the preset table to determine the fire risk level based on the firefighting score, more descriptions may be found in FIG. 2 and related descriptions.

In 350, in response to determining that the monitoring feedback indicates anomalies, setting the fire risk level to a highest risk level.

In some embodiments, when the monitoring feedback indicates anomalies, the smart gas government safety supervision management platform 120 sets the fire risk level of the at least one enterprise to the highest risk level. The highest risk level is a fire safety risk level with the strongest prevention and control capability for the fire risk. For example, if the fire risk level includes the first level to the fourth level, and the fourth level indicates the strongest prevention and control capability for the fire risk, and the fire risk level is set to the fourth level.

A stage with a relatively high risk of gas fire hazard may be divided into one or more sub-stages, and the stage with a relatively low risk of gas fire hazard may be divided into one or more sub-stages. Dividing the firefighting stage according to the risk of fire hazard is more suitable for regulation requirements of gas fire, thus making the determined fire risk level more in line with reality.

Figure 4:
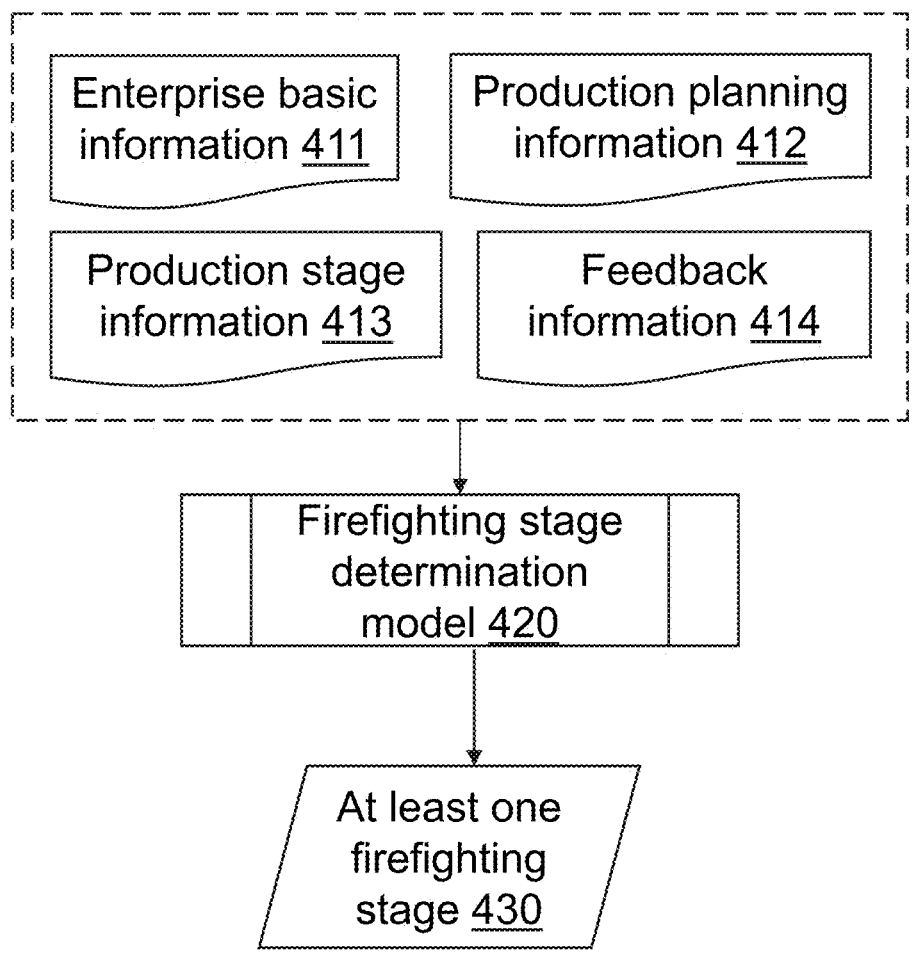
FIG. 4 is an exemplary schematic diagram illustrating a firefighting stage determination model according to some embodiments of the present disclosure.

FIG. 4 is an exemplary schematic diagram illustrating a firefighting stage determination model according to some embodiments of the present disclosure.

In some embodiments, as shown in FIG. 4, the determining at least one firefighting stage of each of the one or more enterprises based on the production stage information and the feedback information of the one or more enterprises includes: determining the at least one firefighting stage 430 based on enterprise basic information 411, the production planning information 412, the production stage information 413, and the feedback information 414 of the one or more enterprises through a firefighting stage determination model 420.

The enterprise basic information is information related to the enterprise's own fire safety, such as an enterprise scale, a number of fire drills in the enterprise, and a product hazard. The enterprise scale may include ground occupied by the enterprise, the number of employees, the production value, or the like. The number of fire drills in the enterprise may be a number of fire drills conducted by the enterprise since the establishment or within a preset period of time. The product hazard refers to a danger degree of products in the production process. The product hazard includes flammability and explosiveness. The products of the production process include intermediate products and final products.

In some embodiments, the enterprise basic information is obtained based on the smart gas government safety supervision object platform 140. More descriptions of the production planning information, the production stage information, and the feedback information may be found in FIG. 2 and related descriptions. More descriptions of the firefighting stage may be found in refer to FIG. 3 and related descriptions.

The firefighting stage determination model is a model used to determine the firefighting stages. In some embodiments, the firefighting stage determination model is a machine learning model such as a Neural Networks (NN) model, a Deep Neural Networks (DNN) model, or at least one of other models.

In some embodiments, the firefighting stage determination model is obtained by training a large number of first training samples and first labels corresponding to the first training samples. In some embodiments, a plurality of the first training samples with the first labels is input into an initial firefighting stage determination model, a loss function is constructed from the first labels and the results of the initial firefighting stage determination model, parameters of the initial firefighting stage determination model are updated based on the loss function via gradient descent or other manners. The training of the model is completed when a preset condition is satisfied, and the trained firefighting stage determination model is obtained. The preset condition may be that the loss function converges, a number of iterations reaches a threshold, or the like.

Each set of training samples in the first training samples may include sample enterprise basic information, sample production planning information, sample production stage information, and sample feedback information in the sample data. The first training samples may be obtained from historical data. In some embodiments, an actual setting of the firefighting stage corresponding to the least number of incidents in the subsequent actual firefighting monitoring is used as the first label corresponding to the first training sample. The first label may be obtained by manual labeling or automatic labeling.

In some embodiments, training of the firefighting stage determination model includes at least a first stage of training. The first stage of training includes: training the firefighting stage determination model based on a first training dataset; verifying the firefighting stage determination model based on a first validation dataset; and testing the firefighting stage determination model based on a first test dataset;

In some embodiments, the first training dataset, the first test dataset, and the first validation dataset include historical production stage information, historical feedback information corresponding to the historical production stage information, and historical enterprise basic information extracted from historical data. A ratio of a data volume of the first training dataset, a data volume of the first test dataset, and a data volume of the first validation dataset are set to a first preset ratio. The first preset ratio may be set in advance, such as 8:1:1.

In some embodiments, there is no data overlap among the first training dataset, the first test dataset, and the first validation dataset. There is no data overlap indicates that the same data may only be present in one dataset of the first training dataset, the first test dataset, or the first validation dataset.

In some embodiments, a sample statistical difference of the first training dataset is greater than a preset difference threshold. The sample statistical difference reflects a sample diversity of the first training set, the greater the sample diversity, the greater the sample statistical difference.

In some embodiments, the smart gas government safety supervision management platform 120 may quantify each group of historical production stage information and the corresponding historical feedback information, and the historical enterprise basic information in the first training dataset into numbers, and construct a number vector; calculate a vector distance, such as a cosine distance, between two samples in the first training dataset; calculate a statistical value, such as a variance, of a plurality of vector distances; the larger the variance, the larger the sample statistical difference.

The preset difference threshold is a preset threshold for statistical differences in the samples. In some embodiments, the preset difference threshold is related to a statistical value of the severity of the historical gas fire incident. The statistical value may be a variance, and the greater the variance of the severity of the historical gas fire incident, the greater the preset difference threshold.

By determining the statistical difference of the samples, the model can be made more robust and prevented from overfitting. The higher the variance of the severity of the gas fire incident, the more uncertain the gas incident and the more potential impacts of the various aspects involved, so the preset difference threshold is adjusted upward to make the firefighting stage determination model learn from a more widely distributed data samples to learn more accurately predictions about the target. The stability and accuracy of the firefighting stage determination model can be improved through the first training process.

Figure 5:
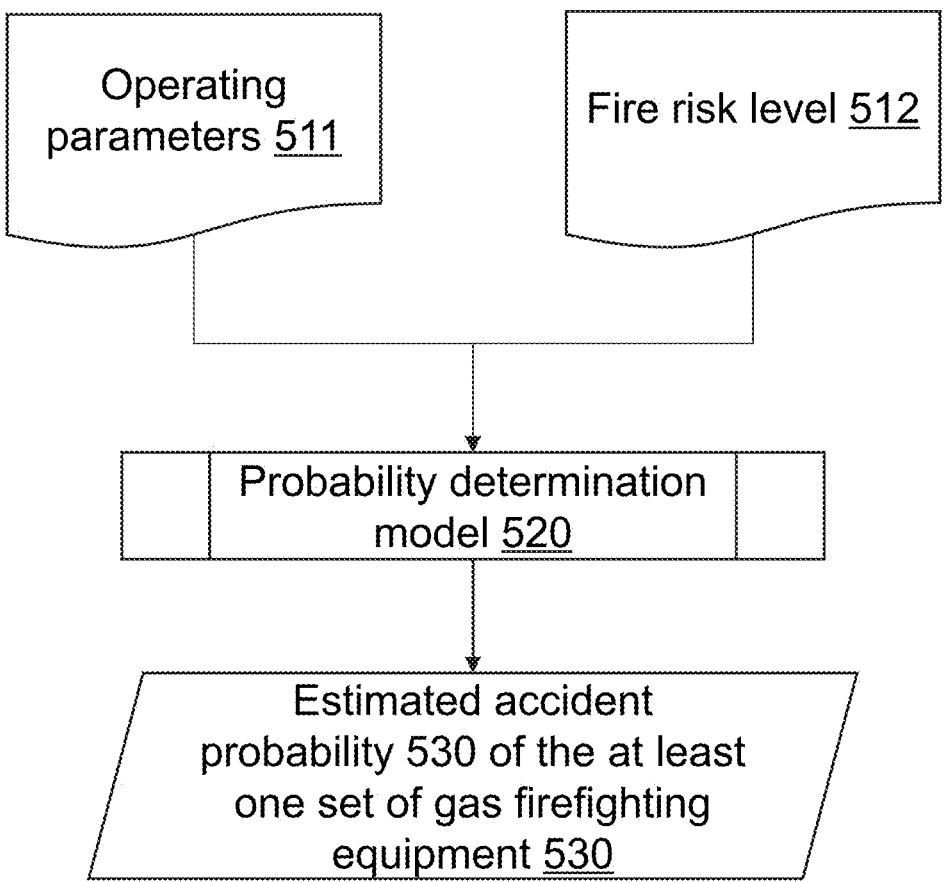
FIG. 5 is an exemplary schematic diagram illustrating a probability determination model according to some embodiments of the present disclosure.

FIG. 5 is an exemplary schematic diagram illustrating a probability determination model according to some embodiments of the present disclosure.

In some embodiments, the determining the estimated accident probability of the at least one set of gas firefighting equipment based on the hidden danger processing data, the operating parameters, the at least one firefighting stage, and the fire risk level of the at least one set of the gas firefighting equipment includes: determining, through a probability determination model 520, the estimated accident probability 530 of the at least one set of gas firefighting equipment based on the operating parameters 511 and the fire risk level 512 of the at least one set of gas firefighting equipment.

The probability determination model is a model used to determine the estimated accident probability. In some embodiments, the probability determination model is a machine learning model, such as at least one of a Neural Networks (NN) model, a Deep Neural Networks (DNN) model, or other model.

In some embodiments, the probability determination model is trained based on a second training dataset. The second training dataset includes second training samples and second labels. The training process for the probability determination model is similar to the training process for the firefighting stage determination model, for more descriptions please refer to FIG. 4.

Each set of training samples in the second training samples may include sample operating parameters of the sample gas firefighting equipment of the sample enterprise and a sample fire risk level. In some embodiments, the second training dataset is generated based on the hidden danger processing data.

In some embodiments, the smart gas government safety supervision management platform 120 may match in the hidden danger processing data based on the second training samples, and use obtained accident probabilities as the second labels corresponding to the second training samples.

For example, for an accident record 1 corresponding to a set of the second training dataset, a second feature vector is constructed based on the accident record 1, and a second similarity between the operating parameters corresponding to the accident record 1 and the fire risk level corresponding to the accident record 1, which is higher than a preset threshold for all accident records corresponding to the second reference vector, is searched in the hidden danger processing data to satisfy a preset ranking, a, and the frequency of the subsequent accidents is calculated. The lowest accident frequency is take as the second label of the accident record 1. As another example, the average of the frequency of subsequent accidents is used as the label of accident record 1. More descriptions of the second similarity may be found in FIG. 3 and related descriptions.

Some embodiments of the present disclosure, based on the operating parameters and the fire risk level, the estimated accident probability is determined via the probability determination model, which can improve the accuracy and efficiency of the data processing and make the estimated accident probability more accurate.

The basic concepts have been described above, and it is apparent to those skilled in the art that the foregoing detailed disclosure serves only as an example and does not constitute a limitation of the specification. While not expressly stated herein, various modifications, improvements, and amendments may be made to the specification by those skilled in the art. Those types of modifications, improvements, and amendments are suggested in the specification, so those types of modifications, improvements, and amendments remain within the spirit and scope of the exemplary embodiments of the specification.

Also, the specification uses specific words to describe embodiments of the specification, such as "some embodiments" means a feature, structure, or characteristic associated with at least one embodiment of the present disclosure. Accordingly, it should be emphasized and noted that "some embodiments" referred to two or more times in different locations in the present disclosure do not necessarily refer to the same embodiment. In addition, certain features, structures, or characteristics of one or more embodiments of the present disclosure may be suitably combined.

Furthermore, unless expressly stated in the claims, the order of the processing elements and sequences described herein, the use of numerical letters, or the use of other names are not intended to qualify the order of the processes and methods of the specification. While some embodiments of the invention that are currently considered useful are discussed in the foregoing disclosure by way of various examples, it should be appreciated that such details serve only illustrative purposes, and that additional claims are not limited to the disclosed embodiments, rather, the claims are intended to cover all amendments and equivalent combinations that are consistent with the substance and scope of the embodiments of the specification. For example, although the implementation of various components described above may be embodied in a hardware device, it may also be implemented as a software only solution, e.g., an installation on an existing server or mobile device.

Similarly, it should be noted that in order to simplify the presentation of the disclosure of the specification, and thereby aid in the understanding of one or more embodiments of the invention, the foregoing descriptions of embodiments of the specification sometimes group multiple features together in a single embodiment, accompanying drawings, or in a description thereof. description thereof. However, the method of disclosure does not imply that the objects of the present disclosure require more features than those mentioned in the claims. Rather, claimed subject matter may lie in less than all features of a single foregoing disclosed embodiment.

Some embodiments use numbers to describe the number of components, attributes, and it should be understood that such numbers used in the description of an embodiment are modified in some examples by the modifiers "about", "approximately", or "generally" is used in some examples. Unless otherwise noted, the terms "about," "approximately," or "generally" indicates that a ±20% variation in the stated number is allowed. Correspondingly, in some embodiments, the numerical parameters used in the specification and claims are approximations, which can change depending on the desired characteristics of individual embodiments. In some embodiments, the numerical parameters should take into account the specified number of valid digits and employ general place-keeping. While the numerical domains and parameters used to conenterprise the breadth of their ranges in some embodiments of the specification are approximations, in specific embodiments such values are set to be as precise as possible within a feasible range.

For each of the patents, patent applications, patent application disclosures, and other materials cited in the specification, such as articles, books, specification sheets, publications, documents, or the like, are hereby incorporated by reference in their entirety into the specification. Application history documents that are inconsistent with or conflict with the contents of the specification are excluded, as are documents (currently or hereafter appended to the specification) that limit the broadest scope of the claims of the specification. It should be noted that in the event of any inconsistency or conflict between the descriptions, definitions, and/or use of terms in the materials appended to the specification and those set forth herein, the descriptions, definitions and/or use of terms in the specification shall control. use shall prevail.

Finally, it should be understood that the embodiments described in the specification are only used to illustrate the principles of the embodiments of the specification. Other deformations may also fall within the scope of the specification. As such, alternative configurations of embodiments of the present disclosure may be viewed as consistent with the teachings of the present disclosure as an example, not as a limitation. Correspondingly, the embodiments of the present disclosure are not limited to the embodiments expressly presented and described herein.

What is claimed is:

1. A method for smart gas firefighting linkage based on government safety supervision, wherein the method is executed by a smart gas government safety supervision management platform based on an Internet of Things (IoTs) system for smart gas firefighting linkage based on government safety supervision, and the smart gas government safety supervision management platform is configured as one or more of a microcontroller (MCU), an embedded processor, and a graphics processing unit (GPU), the method comprising:

obtaining gas consumption statistics information of one or more enterprises based on one or more flow monitoring devices controlled by a gas equipment object platform; wherein the gas equipment object platform is configured as a gas firefighting equipment; the gas firefighting equipment includes at least one of an alarming device, an alarming self-testing device, and a gas concentration detection device; and the flow monitoring devices include flow sensors;

obtaining current production data and production planning information of the one or more enterprises through a gas-using enterprise management platform on a smart gas government safety supervision object platform; wherein the gas-using enterprise management platform refers to a platform for managing information related to an enterprise that uses gas; and the current production data and the production planning information are uploaded by an enterprise user;

determining production stage information of the one or more enterprises based on the gas consumption statistics information, the current production data, and the production planning information of the one or more enterprises;

obtaining feedback information from a gas company management platform of the smart gas government safety supervision object platform based on the production stage information of the one or more enterprises;

obtaining at least one of alarm information, malfunction information, operating parameters, and hidden danger processing data of at least one set of the gas firefighting equipment of the one or more enterprises;

assessing a fire risk level of each of the one or more enterprises based on at least one of the production stage information, the feedback information, the alarm information and/or the malfunction information, the operating parameters, and the hidden danger processing data of the at least one set of the gas firefighting equipment, wherein the assessing the fire risk level of each of the one or more enterprises further includes:

determining at least one firefighting stage of each of the one or more enterprises based on the production stage information and the feedback information of the one or more enterprises; wherein the firefighting stage is a stage that is divided according to firefighting-related requirements in a production process of the one or more enterprises;

in response to determining that monitoring feedback obtained from a smart gas government safety supervision service platform indicates no anomalies, assessing the fire risk level of each of the one or more enterprises based on the at least one firefighting stage, and the alarm information, the malfunction information, the operating parameters, and the hidden danger processing data of the at least one set of the gas firefighting equipment; and in response to determining that the monitoring feedback indicates anomalies, setting the fire risk level to a highest risk level;

determining fire control parameters of the one or more enterprises based on the fire risk level of the one or more enterprises and the hidden danger processing data, including:

determining an estimated accident probability and estimated accident information of the at least one set of the gas firefighting equipment based on the hidden danger processing data, the operating parameters, the at least one firefighting stage, and the fire risk level of the at least one set of the gas firefighting equipment, including:

constructing a second feature vector based on the operating parameters and the fire risk level of the at least one set of the gas firefighting equipment, and constructing a second reference vector based on historical operating parameters and historical fire risk level of the at least one set of the gas firefighting equipment in the hidden danger processing data;

calculating a third similarity between the second feature vector and the second reference vector;

statistically counting accident records corresponding to all second reference vectors of which the third similarity satisfies a preset ranking and is higher than a preset threshold; and determining the estimated accident probability and the estimated accident information, based on the firefighting stage, the third similarity, and the accident records; and determining the fire control parameters of the one or more enterprises based on the estimated accident probability, the estimated accident information, and the operating parameters of the at least one set of the gas firefighting equipment and a first preset threshold, wherein the fire control parameters include adjusted operating parameters and enterprise fire inspection cycle of at least one set of updated gas firefighting equipment;

wherein the adjusted operating parameters include an updated gas concentration alarm threshold, an updated hidden danger self-testing cycle, and an updated alarming device self-testing cycle; and the enterprise fire inspection cycle refers to a periodic schedule of fire safety inspections and sampling for the enterprise;

determining an update command based on the adjusted operating parameters; and sending the update command to at least one set of the gas firefighting equipment corresponding to the update command, and controlling the gas firefighting equipment to operate based on the adjusted operating parameters, wherein the controlling the gas firefighting equipment to operate based on the adjusted operating parameters includes:

controlling the gas concentration detection device to detect an ambient gas concentration, and sending the ambient gas concentration to the alarming device via communication components of the gas concentration detection device;

in response to the ambient as concentration exceeding the updated gas concentration alarm threshold, controlling the alarming device to record an alarm time and the ambient as concentration corresponding to the alarm time as the alarm information, and to issue the alarm information by voice or audible and light messages; and controlling the alarm self-testing device to detect whether the gas concentration detection device is operating properly based on the updated hidden danger self-testing cycle, and controlling the alarming self-testing device to detect whether the alarm in a device is operating properly based on the alarming device self-testing cycle; and in response to at least one of the gas concentration detection device and the alarming device operating improperly, controlling the alarming self-testing device to send the malfunction information to at least one of the smart gas government safety supervision object platform or the smart gas government safety supervision management platform.

2. The method of claim 1, wherein the determining at least one firefighting stage of each of the one or more enterprises based on the production stage information and the feedback information of the one or more enterprises includes:

determining the at least one firefighting stage based on enterprise basic information, the production planning information, the production stage information, and the feedback information of the one or more enterprises through a firefighting stage determination model, the firefighting stage determination model being a machine learning model, the enterprise basic information being obtained based on the smart gas government safety supervision object platform, wherein the firefighting stage determination model is at least one of a Neural Networks (NN) model and a Deep Neural Networks (DNN) model; the firefighting stage determination model is obtained by training a large number of first training samples and first labels corresponding to the first training samples; wherein training of the firefighting stage determination model includes at least a first stage of training, the first stage of training including:

training the firefighting stage determination model based on a first training dataset;

verifying the firefighting stage determination model based on a first validation dataset; and testing the firefighting stage determination model based on a first test dataset; wherein the first training dataset, the first test dataset, and the first validation dataset include historical production stage information. historical feedback information corresponding to the historical production stage information, and historical enterprise basic information extracted from historical data; a ratio of a data volume of the first training dataset, a data volume of the first test dataset, and a data volume of the first validation dataset is set to a first preset ratio; no data overlap is among the first training dataset, the first test dataset, and the first validation dataset; a sample statistical difference of the first training dataset is greater than a preset difference threshold; the preset difference threshold is related to a statistical value of severity of historical gas fire incident, and the statistical value includes a variance; and the first training samples with the first labels are input into an initial firefighting stage determination model, a loss function is constructed from the first labels and results of the initial firefighting stage determination model, parameters of the initial firefighting stage determination model are updated based on the loss function via gradient descent; and the training of the firefighting stage determination model is completed when a preset condition is satisfied, and the trained firefighting stage determination model is obtained; wherein the preset condition is that the loss function converges, a number of iterations reaches a threshold.

3. The method of claim 1, wherein the method further comprises:

determining, through a probability determination model, the estimated accident probability of the at least one set of the gas firefighting equipment based on the operating parameters and the fire risk level of the at least one set of the gas firefighting equipment; wherein the probability determination model is trained based on a second training dataset including second training samples and second labels; wherein the second labels corresponding to the second training samples are accident probabilities obtained by matching in the hidden danger processing data based on the second training samples; and the probability determination model is a machine learning model.

4. The method of claim 1, wherein the method further comprises:

determining, by the alarming self-testing device, whether the at least one of the gas concentration detection device and the alarming device is operating properly, including:

sending, by the alarming self-testing device, a handshake command to the at least one of the gas concentration detection device and the alarming device by communication, and accepting the handshake command by the at least one of the gas concentration detection device and the alarming device, which indicates that the communication of the alarming device is normal.

5. The method of claim 1, wherein the method further comprises:

controlling the gas firefighting equipment to conduct the fire safety inspections and the sampling, based on the enterprise fire inspection cycle of the at least one set of the updated gas firefighting equipment, for sampling of the alarm information, the ambient gas concentration, and the malfunction information of the gas firefighting equipment.

6. An Internet of Things (IoTs) system for smart gas firefighting linkage based on government safety supervision, comprising: a smart gas government safety supervision service platform, a smart gas government safety supervision management platform, a smart gas government safety supervision sensor network platform, a smart gas government safety supervision object platform, a gas company sensor network platform, a gas equipment object platform, a smart gas user platform and a smart gas service platform, wherein the smart gas government safety supervision object platform includes a gas company management platform and a gas-using enterprise management platform, wherein the gas equipment object platform is configured to control one or more flow monitoring devices to obtain gas consumption statistics information of one or more enterprises;

wherein the gas equipment object platform is configured as a gas firefighting equipment; the gas firefighting equipment includes at least one of an alarming device, an alarming self-testing device, and a gas concentration detection device; and the flow monitoring devices include flow sensors;

the smart gas government safety supervision management platform is configured as one or more of a microcontroller (MCU), an embedded processor, and a graphics processing unit (GPU);

wherein the smart gas government safety supervision management platform is configured to:

determine production stage information of the one or more enterprises based on the gas consumption statistics information, current production data, and production planning information of the one or more enterprises;

obtain feedback information from the gas company management platform of the smart gas government safety supervision object platform based on the production stage information of the one or more enterprises;

obtain at least one of alarm information, malfunction information, operating parameters, and hidden danger processing data of at least one set of the gas firefighting equipment of the one or more enterprises;

assess a fire risk level of each of the one or more enterprises based on at least one of the production stage information, the feedback information, the alarm information and/or the malfunction information, the operating parameters, and the hidden danger processing data of the at least one set of the gas firefighting equipment, wherein to assess the fire risk level of each of the one or more enterprises, the smart gas government safety supervision management platform is further configured to:

determine at least one firefighting stage of each of the one or more enterprises based on the production stage information and the feedback information of the one or more enterprises; wherein the firefighting stage is a stage that is divided according to firefighting-related requirements in a production process of the one or more enterprises;

in response to determining that monitoring feedback obtained from the smart gas government safety supervision service platform indicates no anomalies, assess the fire risk level of each of the one or more enterprises based on the at least one firefighting stage, and the alarm information, the malfunction information, the operating parameters, and the hidden danger processing data of the at least one set of the gas firefighting equipment; and in response to determining that the monitoring feedback indicates anomalies, set the fire risk level to a highest risk level;

determine fire control parameters of the one or more enterprises based on the fire risk level of the one or more enterprises and the hidden danger processing data, including:

determining an estimated accident probability and estimated accident information of the at least one set of the agas firefighting equipment based on the hidden danger processing data, the operating parameters, the at least one firefighting stage, and the fire risk level of the at least one set of the gas firefighting equipment, including:

constructing a second feature vector based on the operating parameters and the fire risk level of the at least one set of the gas firefighting equipment, and constructing a second reference vector based on historical operating parameters and historical fire risk level of the at least one set of the gas firefighting equipment in the hidden danger processing data;

calculating a third similarity between the second feature vector and the second reference vector;

statistically counting accident records corresponding to all second reference vectors of which the third similarity satisfies a preset ranking and is higher than a preset threshold; and determining the estimated accident probability and the estimated accident information, based on the firefighting stage, the third similarity, and the accident records; and determining the fire control parameters of the one or more enterprises based on the estimated accident probability, the estimated accident information, and the operating parameters of the at least one set of the gas firefighting equipment and a first preset threshold, wherein the fire control parameters include adjusted operating parameters and enterprise fire inspection cycle of at least one set of updated gas firefighting equipment;

wherein the adjusted operating parameters includes an updated gas concentration alarm threshold, an updated hidden danger self-testing cycle, and an updated alarming device self-testing cycle: and the enterprise fire inspection cycle refers to a periodic schedule of fire safety inspections and sampling for the enterprise;

determine an update command based on the adjusted operating parameters; and send the update command to at least one set of the gas firefighting equipment, and control the one set of gas firefighting equipment to operate according to the adjusted operating parameters, wherein to control the one set of gas firefighting equipment to operate based on the adjusted operating parameters, the smart gas government safety supervision management platform is further configured to:

control the gas concentration detection device to detect an ambient gas concentration, and send the ambient gas concentration to the alarming device via communication components of the gas concentration detection device;

in response to the ambient gas concentration exceeding the updated gas concentration alarm threshold, control the alarming device to record an alarm time and the ambient gas concentration corresponding to the alarm time as the alarm information, and to issue the alarm information by voice or audible and light messages; and control the alarming self-testing device to detect whether the gas concentration detection device is operating properly based on the updated hidden danger self-testing cycle, and control the alarming self-testing device to detect whether the alarming device is operating properly based on the alarming device self-testing cycle; and in response to at least one of the as concentration detection device and the alarming device operating improperly, control the alarming self-testing device to send the malfunction information to at least one of the smart gas government safety supervision object platform or the smart gas government safety supervision management platform.

7. The system of claim 6, wherein the smart gas government safety supervision management platform is further configured to:

determine the at least one firefighting stage based on enterprise basic information, the production planning information, the production stage information, and the feedback information of U1e one or more enterprises through a firefighting stage determination mode!, the firefighting stage determination model being a machine learning model, the enterprise basic information being obtained based on the smart gas government safety supervision object platform, wherein the firefighting stage determination model is at least one of a Neural Networks (NN) model and a Deep Neural Networks (DNN) model; the firefighting stage determination model is obtained by training a large number of first training samples and first labels corresponding to the first training samples;

wherein training of the firefighting stage determination model includes at least a first stage of training, the first stage of training includes:

training the firefighting stage determination model based on a first training dataset;

verifying the firefighting stage determination model based on a first validation dataset; and testing the firefighting stage determination model based on a first test dataset; wherein the first training dataset, the first test dataset, and the first validation dataset include historical production stage information, historical feedback information corresponding to the historical production stage information, and historical enterprise basic information extracted from historical data; a ratio of a data volume of the first training dataset, a data volume of the first test dataset, and a data volume of the first validation dataset is set to a first preset ratio; there is no data overlap is among the first training dataset, the first test dataset, and the first validation dataset; a sample statistical difference of the first training dataset is greater than a preset difference threshold; the preset difference threshold is related to a statistical value of severity of historical gas fire incident. and the statistical value includes a variance; and the first training samples with the first labels are input into an initial firefighting stage determination model, a loss function is constructed from the first labels and results of the initial firefighting stage determination model, parameters of the initial firefighting stage determination model are updated based on the loss function via gradient descent; and the training of the firefighting stage determination model is completed when a preset condition is satisfied, and the trained firefighting stage determination model is obtained; wherein the preset condition is that the loss function converges, a number of iterations reaches a threshold.

* * * * *